United States Patent Office 3,120,278
Patented Feb. 4, 1964

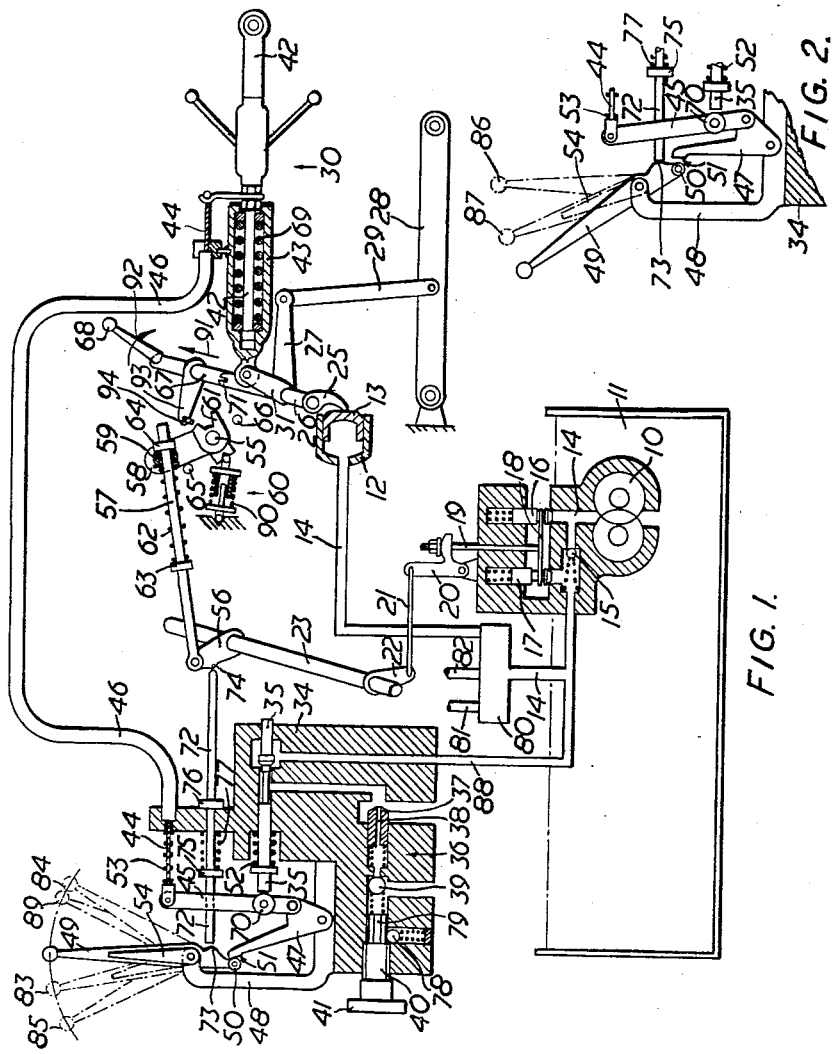

3,120,278
HYDRAULIC POWER LIFT MECHANISMS
Herbert Edward Ashfield, Huddersfield, and Charles Hartley Hull and Harry Horsfall, Meltham, England, assignors to David Brown Tractors (Canada) Limited
Filed Feb. 18, 1960, Ser. No. 9,472
Claims priority, application Great Britain Feb. 27, 1959
13 Claims. (Cl. 172—9)

The invention relates to hydraulic power lift mechanisms for agricultural tractors and the like and more particularly to the known type of lift mechanism whereby the working depth of an implement hitched to a tractor or the like, and not provided with its own depth-regulating means, is automatically controlled by the draft force exerted on the implement.

Hitherto the pressure in lift mechanisms of this type has been automatically reduced to zero, or substantially to zero, when a decrease in draft force has occurred, for example due to the spinning of the driving wheels of the tractor or the like when a slippery patch of soil has been encountered. As a result of this an increase in the working depth of the implement has been permitted, whereupon the spinning of the said driving wheels has been aggravated.

The principal object of the invention is to provide a new or improved hydraulic power lift mechanism of the type referred to in which a continuous transference of weight from the implement to the tractor or the like can be effected and be prevented from falling below a predetermined minimum value, to assist the adhesion of the driving wheels with the ground.

A further object of the invention is to enable the new or improved hydraulic power lift mechanism to transfer to the tractor or the like part of the weight of an implement provided with its own depth-regulating means such as a wheel or skid, and also to lift or lower the said implement, without being influenced by the draft force exerted on the implement.

Yet another object of the invention is to enable the new or improved hydraulic power lift mechanism to raise, hold in any desired position, or lower any implement or other mechanism actuated either by the hitch linkage of the tractor or the like or by an auxiliary hydraulic cylinder, without being influenced by any draft force exerted on the implement and without the hydraulic mechanism transferring any weight to the tractor or the like.

According to the invention a hydraulic power lift machanism for a tractor or the like, wherein the working depth of an implement hitched to the tractor or the like is adapted to be automatically controlled by the draft force exerted on the implement, is provided with means adapted to maintain a predetermined minimum pressure in the hydraulic system. Preferably, the hydraulic power lift mechanism comprises a pump adapted to deliver liquid under pressure to a hydraulic cylinder, and valve means controlled by a hand lever, and also operable automatically by variations in the draft force exerted by the tractor or the like on an implement hitched thereto, to control the flow of liquid to further valve means adapted to maintain a predetermined minimum pressure in the hydraulic system. The last mentioned valve means is preferably adjustable to vary its effect upon the pressure in the hydraulic system. Preferably an over-riding manual control is provided to enable the pressure in the hydraulic system to be reduced to zero when desired. Preferably, also, means are provided whereby all automatic control means in the hydraulic power lift mechanism can be rendered inoperative to make the mechanism capable only of raising, holding in any desired position, or lowering an implement or other apparatus, by appropriate movement of the hand lever.

A preferred embodiment of the invention will now be described, by way of example only, with reference to the accompanying drawings, of which:

FIG. 1 is a diagrammatic view of a tractor hydraulic power lift mechanism; and

FIG. 2 shows alternative positions of control means for the mechanism.

Referring now to the drawings, a hydraulic power lift mechanism of an agricultural tractor includes a pump 10 which draws oil from a sump 11 and communicates on its delivery side, by way of a conduit 14, with a single-acting hydraulic cylinder 12 containing a ram 13. A non-return valve 15 is disposed in the conduit 14, and two openings are provided in the said conduit, one on the pump side and one on the cylinder side of the non-return valve 15. These openings are respectively adapted to be closed by spring-loaded valve members 16 and 17 each of which is provided with an axial bleed hole (not shown) to conduct oil under pressure to the rear of the valve, and each valve is so dimensioned that the hydraulic pressure in the closing direction is slightly greater than that in in the opening direction. Each of the said valve members has a portion of reduced diameter with which engages one end of a plate 18 connected to a rod 19 which is operable through a bell crank lever 20 connected by a rod 21 to an arm 22 fixed on a shaft 23 adapted to be oscillated about its axis by means hereinafter referred to. The portion of reduced diameter is longer in the case of the valve member 17 than of the valve member 16, such that upward movement of the plate 18 will lift the valve member 16 from its seat prior to lifting the valve member 17. The connection between the rod 19 and the bell crank lever 20 is such that movement of the bell crank lever in one direction opens one or both of the valve members 16 and 17 whilst movement of the said lever in the other direction does not itself close the valve members but permits them to be closed by their associated springs. The ram 13 is adapted to act on an arm 25 fixed to a shaft 26 extending laterally across the rear of the tractor, and the shaft 26 can thus be rocked to cause two laterally spaced lift arms 27 rigidly carried by the said shaft to swing a pair of laterally spaced links 28 in an upward direction about their points of pivotal connection to the tractor by means or respective lift rods 29. For the sake of clarity, only one lift arm and its associated link and lift rod are shown in FIG. 1. A central, upper link indicated generally at 30 is pivotally connected at its front end to a short arm 31 rigidly connected to the shaft 26. Thus an implement hitched to the rear ends of the two links 28 and of the link 30 can be raised to an inoperative position.

Connected to the conduit 14, between the non-return valve 15 and the cylinder 12 is a conduit 88 communicating with a valve housing 34 in which there is located a slide valve 35. This valve is so dimensioned that when it is open the forces exerted on it in opposite directions by the pressure in the system balance each other out in known manner, and it is adapted to be closed by a spring 52. The valve 35 is adapted to throttle the flow of oil from the conduit 88 to a valve indicated generally at 36 which is also located in the housing 34. The valve 36 comprises a spring-closed valve member 37 provided with an axial bleed hole 38 through which oil can communicate with an adjustable relief valve consisting of a spring-loaded ball 39 and a screwed adjusting member 40 having a hand wheel 41. The valve member 37 is so dimensioned that when closed the hydraulic pressure in the closing direction is slightly greater than that in the opening direction. A spring-loaded ball 78 is adapted to engage with axial grooves 79 in the member 40 so that the operator can readily adjust the valve 36 by any determined amount indicated by the number of times the ball is felt to engage in a groove. The arrangement of the valve 36 is such that when the pressure acting on the said valve exceeds a value determined by the setting of the screwed adjusting member 40, the oil which has leaked through the bleed hole 38 lifts the spring-loaded ball 39 from its seat and unbalances the valve member 37, which thus opens to an extent sufficient to maintain a predetermined pressure drop across the valve 36.

The position of the slide valve 35 is controlled by a Bowden cable connected to the central, upper link 30 previously referred to. This is achieved by making the said link of two mutually telescopic parts 42 and 43 between which there is located a compression spring 69 adapted to resist both lengthening and shortening of the link 30 from an intermediate or nominal length. The part 43 is pivotally connected to the arm 31 on the shaft 26 journalled on the tractor, and the part 42 is moveable axially relative to the part 43, against the action of the spring 69, by any increase or decrease in the draft force exerted on an implement (not shown) connected to the tractor by means of the two links 28 and of the part 42 of the link 30. So-called Bowden cable is well known and comprises a flexible wire extending slideably through a flexible tubular casing. The wire 44 of the Bowden cable is connected at one end to the part 42 of the link 30 and at the other end to one end of a lever 45, whilst the casing 46 which surrounds the wire 44 abuts at one end against the part 43 of the link 30 and at the other end against the valve housing 34. The lever 45 is provided, intermediate its ends, with a roller 70 adapted to bear against one end of the slide valve 35, and is pivotally connected at its end remote from the Bowden cable to a member 47 pivoted on the valve housing 34. Pivoted on an arm 48 extending from the valve housing 34 is a hand lever 49 carrying a roller 50 adapted to bear against a surface 51 on the member 47. The spring 52 and a light compression spring 53 on the wire 44 act to stabilise the lever 45 and the member 47. Friction means (not shown) are provided at the pivot of the hand lever 49 to hold the lever in any desired position against the action of the spring 52. A datum lever 54 is also pivoted on the arm 48 about the same axis as the lever 49, and is likewise held in any desired position by the said friction means, with a greater force than that which holds the hand lever 49. The datum lever 54 has two marks, and can be adjusted to bring one or the other of the said marks into alignment with a mark on the arm 48 for reasons hereinafter referred to. Means are provided to differentiate between the said marks, comprising the word "hold" stamped adjacent one of the marks and the words "weight transfer" stamped adjacent the other.

The shaft 23 has fixed to it an arm 56 which is pivotally connected to one end of a rod 57, the other end of which is connected by lost motion means to an arm 58 pivotable about a fixed axis 55. The said lost motion means comprise a stud 59 rotatably connected to the arm 58 and having a diametrical bore in which the rod 57 is slideable. A compression spring 62 is located between the stud 59 and a flange 63 on the rod 57, and the rearward end of the rod 57 is provided with another flange 64. An over-centre device indicated generally at 60, and including a coil spring 90, is associated with the arm 58, and a cam member 61 is rigidly connected to the said arm. Stops 65 and 66 are provided to limit angular movement of the arm 58. An axially moveable shaft 67 carries rigidly a selector lever 68 and an arm 93 carrying a peg 94 adapted to engage with the cam member 61. The shaft 67 is co-axial with the shaft 26 and is adapted to be driveably coupled thereto by means of a tongue and groove connection 71.

A rod 72 is slideable longitudinally in the valve housing 34 and is adapted to abut at one end against a projection 73 on the hand lever 49 and at the other end against a projection 74 on the arm 56. The said rod has two fixed flanges 75 and 76 located on opposite sides of the valve housing 34, and a compression spring 77 is located between the flange 75 on the valve housing.

A valve chest 80 is disposed in the conduit 14 and contains conventional manually-operated means (not shown) for selectively admitting oil either to the cylinder 12 or through either of the conduits 81 and 82 to an auxiliary hydraulic cylinder (not shown).

Relief valve means (not shown) are provided in known manner to limit the maximum pressure in the system to a safe permissible value.

The manner of operation as a depth control system is as follows:

The shaft 67 is driveably coupled to the shaft 26, the shaft 44 is connected to the part 42 of the link 30 and communication is established through the valve chest 80 between the pump 10 and cylinder 12. With an implement (not shown) connected to the two links 28 and to the link 30, and not provided with its own depth-regulating means, is in working position, the valve members 16 and 17 are closed and the hand lever 49 is in such a position as to maintain the implement at the desired working depth by causing the slide valve 35 to throttle the flow of oil from the pump 10 to the valve 36. FIG. 1 illustrates the mechanism in these conditions, the hand lever 49 and datum lever 54 being shown in full lines in a typical position. If any variation occurs in the draft force exerted on the implement, the central, upper link 30 either lengthens or shortens with the result that the lever 45 connected to the wire 44 pivots about its point of connection to the member 47 and increases or decreases the flow of oil past the slide valve 35 by effecting axial movement of said slide valve. A decrease in draft force will extend the central, upper link 30 and reduce the pressure drop across the slide valve 35, thereby reducing the pressure in the cylinder 12 and permitting the working depth of the implement to increase. Conversely, when an increase in draft force occurs, the mechanism operates to reduce the working depth of the implement. In no case, however, can the pressure in the system fall below a minimum value determined by the setting of the screwed adjusting member 40 of the valve 36. Thus, there is always a certain amount of weight being transferred from the implement to the tractor to reduce any tendency for the driving wheels of the tractor to spin. Variations in the working depth of the implement are effected by the driver moving the hand lever 49 to any desired position between the ghosted positions 83 and 89 in FIG. 1. At the same time he can move the datum lever 54 to the same position in order to mark said position for future reference. Such movement of the hand lever 49 causes the member 47 to pivot the lever 45 about its point of connection with wire 44 so as to move the slide valve 35 axially, and to increase or decrease the pressure drop across the said slide valve as previously described.

When it is desired to raise the implement clear of the ground, the hand lever 49 is moved by the driver to the position 84 in which the roller 50 no longer makes contact with the member 47. If the implement is to be subsequently lowered to the same working depth as before, the driver does not move the datum lever 54. The slide valve 35 is, therefore, closed by the associated spring 52 and, since the valve members 16 and 17 are closed, the pressure in the conduit 14 and thus in the cylinder 12 increases to a value sufficient to lift the implement. During the last few degrees of rocking movement of the shaft 26, the peg 94 carried by the arm 93 engages with the cam member 61 and moves the device 60 over-centre. The spring 90 then acts through the arm 58, rod 57, arm 56, shaft 23, arm 22, rod 21, bell crank lever 20, rod 19 and plate 18 to throw open the valve member 16 and permit the oil delivered by the pump 10 to be discharged back into the sump 11. The oil contained in the hydraulic system will be locked there by the non-return valve 15 and valve member 17 to hold the implement in its raised position. If any leakage of oil should occur to cause the implement to fall below a certain height, however, the over-centre device 60 will operate to effect the closure of the valve member 16, whereupon the oil delivered by the pump 10 will be forced past the non-return valve 15 to the hydraulic cylinder 12. When sufficient oil has been admitted to the said cylinder to cause the implement to be returned to the fully raised position, the over-centre device will again operate to open the valve member 16 and permit the oil delivered by the pump 10 to be discharged to the sump 11 as previously described.

When it is desired to lower the implement to the same working depth as before, the hand lever 49 is returned by the driver into alignment with the datum lever whereupon the slide valve 35 is re-opened to the required extent and, as the implement descends due to the oil in the hydraulic cylinder 12 escaping past said slide valve, the over-centre device 60 operates to close the valve member 16. If, however, the implement is light in weight or the soil is hard it may be found that the implement does not penetrate the soil sufficiently quickly. To remedy this, the hand lever 49 is moved by the driver into the ghosted position 85 in FIG. 1. This causes the projection 73 on the hand lever to abut against one end of the rod 72 and move the said rod longitudinally against the action of the spring 77. The other end of the rod 72 thus abuts against the projection 74 on the arm 55 and the resulting angular movement of the shaft 23, against the action of the spring 62, acts through the arm 22, rod 21, bell crank lever 20, rod 19 and plate 18 to open both the valve members 16 and 17 so as to reduce the pressure in the hydraulic system substantially to zero. When the implement has penetrated to the required depth, the hand lever 49 is moved back into alignment with the datum lever 54. The valve members 16 and 17 are thus permitted to close and the implement is again brought under the control of the slide valve 35 and the valve 36.

It is an important feature of the invention that the sensitivity of the hydraulic mechanism to the draft force exerted on the implement can be varied by appropriate adjustment of the valve 36. For example, the mechanism may be caused to operate with a pressure drop of 350 pounds per square inch across the slide valve 35 and a pressure drop of 50 pounds per square inch across the valve member 37, so that the pressure in the hydraulic cylinder 12 is 400 pounds per square inch. To achieve the first mentioned pressure drop the slide valve 35 is nearly closed and even a small movement of the lever 45 due to a small variation in draft force will have a marked effect upon the pressure in the hydraulic cylinder 12. Alternatively, a pressure of 400 pounds per square inch in the cylinder 12 may be achieved by adjusting the pressure drop across the slide valve 35 to, say, 50 pounds per square inch and that across the valve member 37 to 350 pounds per square inch. Thus the slide valve 35 is open to a much greater extent than in the previous example, and accordingly the mechanism is far less sensitive to variations in the draft force exerted on the implement.

The operation of the mechanism as a weight transfer system, without its being influenced by the draft force exerted on the implement, is as follows:

The shaft 67 remains drivably coupled to the shaft 26, the wire 44 remains connected to the part 42 of the link 30 and communication through the valve chest 80 between the pump 10 and cylinder 12 is maintained. An implement having its own depth-regulating means such as a wheel or skid must be employed, and that mark on the datum lever 54 adjacent which the words "weight transfer" are stamped is aligned with the mark on the arm 48. When the hand lever 49 is aligned with the datum lever 54, it will then occupy the ghosted position 83 shown in FIG. 1. In this position of the hand lever, the slide valve 35 is fully open, and even though the Bowden cable is operatively connected to the link 30 the automatic variations in movement of the slide valve caused by variations in the draft force exerted on the implement are insufficient to cause the slide valve to throttle the flow of oil from the pump 10 to the valve 36. Thus the pressure in the hydraulic system is governed solely by the setting of the screwed adjusting member 40, so that a predetermined pressure can be maintained in the system whereby a predetermined constant amount of weight is transferred from the implement to the tractor without affecting the working depth of the implement, which continues to be controlled by its depth-regulating means. The hand lever 49 may also be moved to the ghosted positions 84 and 85 in FIG. 1, the result of so doing being exactly as when the mechanism is operated as a depth control system. Thus when operating as a weight transfer system the hand lever 49 may normally occupy the ghosted position 85 in FIG. 1 so that the oil pressure is substantially zero, but when wheel-spin is encountered the hand lever is moved into the position 83 in alignment with the datum lever 54 whereupon an amount of weight depending upon the setting of the screwed adjusting member 40 is transferred from the implement to the tractor for as long as may be necsesary, after which the hand lever 49 is returned to the position 85 and the pressure in the system reverts substantially to zero. The implement may be raised from its working position, and held in the raised position, by movement of the hand lever 49 to the position 84.

The operation of the hydraulic mechanism to raise, hold in any desired position, or lower any implement or other apparatus actuated either by the hitch linkage of the tractor or by an auxiliary hydraulic cylinder, without the hydraulic mechanism being influenced by any draft force exerted on the implement and without the hydraulic mechanism transferring any weight to the tractor, is as follows:

The shaft 67 is uncoupled from the shaft 26 by sliding it axially in the direction of the arrow 91 and then rotating it in the direction of the arrow 92 by means of the selector lever 68. This disconnects the tongue and groove connection 71 between the said shafts, and ensures that the over-centre device 60 and arm 58 occupy the position shown in FIG. 1, if they were not already in this position. It should be noted that the peg 94 is long enough to contact the cam member 61 even when the shaft 67 has been uncoupled from the shaft 26. Subsequent movement of the shaft 26 cannot affect the valve members 16 and 17. The wire 44 is disconnected from the part 42 of the link 30, so that the lever 45 and the member 47 are rendered inoperable either by movement of the said part 42 or of the hand lever 49. The slide valve 35 and consequently the valve 36 therefore remain closed. Communication is established through the valve chest 80 between the pump 10 and the desired one of the three outlet conduits of said valve chest. Thus oil can be delivered to the cylinder 12 to actuate an implement mounted on the tractor hitch linkage, or to an auxiliary hydraulic cylinder (not shown) forming part of apparatus such as a tractor-mounted loading shovel, bulldozer or hydraulic tipping trailer. The positions of the hand lever 49 when the mechanism is adapted to operate in the manner now being described are shown in FIG. 2. The position shown in full lines is the lowered position, in which the projection 73 abuts against one end of the rod 72. Movement of the lever 49 to this position, against the action of the spring 62 and spring 77, causes the said rod to move the shaft 23 through a sufficiently large angle to open both the valve members 16 and 17 and reduce the pressure in the hydraulic system substantially to zero. Thus the position of the hand lever 49 shown in full lines in FIG. 2 corresponds to the position 85 shown in ghosted lines in FIG. 1.

When it is desired to raise the implement, loader bucket, bulldozer blade or the like, the hand lever 49 is moved to the position 86 shown in ghosted lines in FIG. 2. In this position the projection 73 no longer makes contact with the rod 72 and the action of the springs 77 and 62 is such that both the valve members 16 and 17 are permitted to close. The pressure in the hydraulic system therefore increases to a value sufficient to lift the implement or other apparatus concerned.

When the implement or other apparatus has thus been fully raised it is necessary to move the hand lever 49 manually into the position 87 shown in ghosted lines in FIG. 2. That mark on the datum lever 54 adjacent which the word "hold" is stamped will have been aligned with the mark on the arm 48 to indicate the said position to the driver. The hand lever may also be moved to this position when the implement or other apparatus is only partially raised, if desired. The projection 73 will then abut against one end of the rod 72 but the magnitude of the angular movement imparted to the shaft 23 will only be sufficient to open the valve member 16, whilst the valve member 17 will remain closed. As previously explained, this is due to the portion of reduced diameter which engages with the plate 18 being longer in the case of the valve member 17 than of the valve member 16. The oil delivered by the pump 10 is therefore discharged back into the sump 11, whilst the oil contained in the hydraulic system will be locked there by the non-return valve 15 and valve member 17 to hold the implement or other apparatus concerned in its raised or partially raised position.

It will be apparent that apparatus such as a push-off stacker which requires a movement other than a raising movement can equally well be operated by the hydraulic mechanism in the manner last described.

What is claimed is:

1. In apparatus for combination with a tractor adapted to have an implement hitched thereto and having mechanism for raising and lowering said implement between idle and working positions, said apparatus comprising a power driven pump connected into a substantially closed hydraulic circuit, hydraulic means adapted to be operably connected to said implement raising and lowering mechanism, said hydraulic means being connected to said hydraulic circuit downstream of the discharge side of said pump to be actuated by liquid pressure at the discharge side of the pump, valve means in said circuit operable between positions for respectively building up liquid pressure at the discharge side of the pump sufficient to actuate said hydraulic means to raise said implement and for reducing said pressure for lowering of said implement, means for automatically controlling said valve means in response to changes in draft force exerted on said implement by said tractor, and means in said circuit downstream of the connection of said hydraulic means to said hydraulic circuit for preventing the liquid pressure acting on said hydraulic means from falling below a predetermined value so that during automatic draft control of said implement at least a minimum predetermined liquid pressure is always maintained at said hydraulic means.

2. In the apparatus defined in claim 1, said last means comprising a pressure responsive valve in said circuit adapted to be actuated by the pressure in said circuit.

3. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism, said hydraulic means being connected to said hydraulic circuit downstream of the discharge side of said pump to be actuated by liquid pressure at the discharge side of the pump, valve means in said circuit operable between positions for respectively building up liquid pressure at the discharge side of the pump sufficient to actuate said hydraulic means to raise said implement and for reducing said pressure for lowering of said implement, means for automatically controlling said valve means in response to changes in draft force exerted on said implement by said tractor, manually operable means for additionally controlling said valve means, and further valve means in said circuit downstream of the connection of said hydraulic means to said circuit for preventing the liquid pressure acting on said hydraulic means from falling below a predetermined value so that during automatic draft control of said implement at least a minimum predetermined liquid pressure is always maintained at said hydraulic means.

4. In apparatus for combination with a tractor adapted to have an implement hitched thereto and having mechanism for raising and lowering said implement between idle and working positions, said apparatus comprising a power driven pump connected into a substantially closed hydraulic circuit, hydraulic means adapted to be operably connected to said implement raising and lowering mechanism, said hydraulic means being connected to said hydraulic circuit downstream of the discharge side of said pump to be actuated by liquid pressure at the discharge side of the pump, valve means in said circuit operable between positions for respectively building up liquid pressure at the discharge side of the pump sufficient to actuate said hydraulic means to raise said implement and for reducing said pressure for lowering of said implement, means for automatically controlling said valve means in response to changes in draft force exerted on said implement by said tractor, manually operable means for additionally controlling said valve means, further adjustable valve means in said circuit downstream of the connection of said hydraulic means to said circuit for preventing the liquid pressure acting on said hydraulic means from falling below a predetermined minimum value so that during automatic draft control of said implement at least a minimum predetermined liquid pressure is always maintained at said hydraulic means, and means for adjusting said further valve means to vary its effect upon the liquid pressure acting on the hydraulic means.

5. In apparatus for combination with a tractor adapted to have an implement hitched thereto and having mechanism for raising and lowering said implement between idle and working positions, said apparatus comprising a power driven pump connected into a substantially closed hydraulic circuit, hydraulic means adapted to be operably connected to said implement raising and lowering mechanism, said hydraulic means being connected to said hydraulic circuit downstream of the discharge side of said pump to be actuated by liquid pressure at the discharge side of the pump, valve means in said circuit operable between positions for respectively building up liquid pressure at the discharge side of the pump sufficient to actuate said hydraulic means to raise said implement and for reducing said pressure for lowering of said implement, means for automatically controlling said valve means in response to changes in draft force exerted on said implement by said tractor, means in said circuit downstream of the connection of said hydraulic means to said circuit for preventing the liquid pressure acting on said hydraulic means from falling below a predetermined value so that during automatic draft control of said implement at least a minimum predetermined liquid pressure is always maintained at said hydraulic means, and over-riding manually operable means effective to disable said last named means in said circuit for enabling the liquid pressure acting on the hydraulic means to be reduced to zero.

6. In apparatus for combination with a tractor adapted to have an implement hitched thereto and having mechanism for raising and lowering said implement between idle and working positions, said apparatus comprising a power driven pump connected into a substantially closed hydraulic circuit having a sump, hydraulic means adapted to be operably connected to said implement raising and lowering mechanism, said hydraulic means being connected to said hydraulic circuit downstream of the discharge side of said pump to be actuated by liquid pressure at the discharge side of the pump, valve means in said circuit operable between closed and open positions for respectively building up liquid pressure at the discharge side of the pump sufficient to actuate said hydraulic means to raise said implement and for reducing said pressure for lowering of said implement, means for automatically controlling said valve means in response to changes in draft force exerted on said implement by said tractor, further automatic control means in said circuit downstream of the connection of said hydraulic means to said circuit for preventing the liquid pressure acting on said hydraulic means from falling below a predetermined value so that during automatic draft control of said implement at least a minimum predetermined liquid pressure is always maintained at said hydraulic means, means for rendering inoperative said automatic control means, and further valve means for discharging liquid delivered by the pump direct to said sump and for releasing liquid from the hydraulic means direct to said sump, and manually operable means for selectively controlling said further valve means for raising, holding in any desired position, or lowering the implement.

7. In apparatus for combination with a tractor adapted to have an implement hitched thereto and having mechanism for raising and lowering said implement between idle and working positions respectively, said apparatus comprising a power driven pump continuously discharging liquid and connected into a substantially closed hydraulic circuit, hydraulic means adapted to be operably connected to said implement raising and lowering mechanism said hydraulic means being connected to said hydraulic circuit downstream of the discharge side of said pump to be actuated by liquid pressure at the discharge side of the pump, a slide valve in said circuit operable between positions for respectively building up liquid pressure at the discharge side of the pump sufficient to actuate said hydraulic means to raise said implement and for reducing said pressure for lowering of said implement, motion transmitting means connected to said slide valve and adapted for operative connection to the implement for automatic valve control movement in response to changes in draft force exerted on said implement by said tractor, and further valve means in said circuit downstream of the connection of said hydraulic means to said circuit in series with said slide valve for preventing the liquid pressure acting on said hydraulic means from falling below a predetermined minimum value so that during automatic draft control of said implement at least a predetermined liquid pressure is always maintained at said hydraulic means.

8. In apparatus for combination with a tractor adapted to have an implement hitched thereto and having mechanism for raising and lowering said implement between idle and working positions, said apparatus comprising a power driven pump continuously discharging liquid and connected into a substantially closed hydraulic circuit, hydraulic means adapted to be operably connected to said implement raising and lowering mechanism and connected to be actuated by liquid pressure at the discharge side of the pump, a slide valve in said circuit operable between positions for respectively building up liquid pressure at the discharge side of the pump sufficient to actuate said hydraulic means to raise said implement and for reducing said pressure for lowering of said implement, motion transmitting means connected to said slide valve and adapted for operative connection to the implement for movement in response to changes in draft force exerted on said implement by said tractor, further valve means in series with said slide valve for preventing the liquid pressure acting on said hydraulic means from falling below a predetermined minimum value, a non-return valve connected in the hydraulic circuit between the pump and said hydraulic means, relief valve means on the pump side of said non-return valve for discharging liquid delivered by the pump direct to sump, and means for automatically opening said relief valve means when the implement attains a fully raised position and for automatically closing said relief valve means when the implement is lowered from said fully raised position.

9. In apparatus for combination with a tractor adapted to have an implement hitched thereto and having mechanism for raising and lowering said implement between idle and working positions respectively, said apparatus comprising a power driven pump continuously discharging liquid and connected into a substantially closed hydraulic circuit, hydraulic means adapted to be operably connected to said implement raising and lowering mechanism and connected to be actuated by liquid pressure at the discharge side of the pump, a slide valve in said circuit operable between positions for respectively building up liquid pressure at the discharge side of the pump sufficient to actuate said hydraulic means to raise said implement and for reducing said pressure for lowering of said implement, motion transmitting means connected to said slide valve and adapted for operative connection to the implement for movement in response to changes in draft force exerted on said implement by said tractor, further valve means in series with said slide valve for preventing the liquid pressure acting on said hydraulic means from falling below a predetermined minimum value, a non-return valve connected in the hydraulic circuit between the pump and said hydraulic means, relief valve means on the pump side of said non-return valve for discharging liquid delivered by the pump direct to sump, means for automatically opening said relief valve means when the implement attains a fully raised position and for automatically closing said relief valve means when the implement is lowered from said fully raised position, and mechanical linkage means actuated by the implement raising and lowering mechanism and including over-centre means connected for causing sudden opening and sudden closing of said relief valve means.

10. In apparatus for combination with a tractor adapted to have an implement hitched thereto and having mechanism for raising and lowering said implement between idle and working positions respectively, said apparatus comprising a power driven pump continuously discharging liquid and connected into a substantially closed hydraulic circuit, hydraulic means adapted to be operably connected to said implement raising and lowering mechanism and connected to be actuated by liquid pressure at the discharge side of the pump, a slide valve in said circuit operable between positions for respectively building up liquid pressure at the discharge side of the pump sufficient to actuate said hydraulic means to raise said implement and for reducing said pressure for lowering of said implement, motion transmitting means connected to said slide valve and adapted for operative connection to the implement for movement in response to changes in draft force exerted on said implement by said tractor, further valve means in series with said slide valve for preventing the liquid pressure acting on said hydraulic means from falling below a predetermined minimum value, a non-return valve connected in the hydraulic circuit between the pump and said hydraulic means, relief valve means on the pump side of said non-return valve for discharging liquid delivered by the pump direct to sump, means for automatically opening said relief valve means when the implement attains a fully raised position and for automatically closing said relief valve means when the implement is lowered from said fully raised position and including over-centre means for causing sudden opening and sudden closing of said relief valve means, and over-riding manual control means operably connected for opening said relief valve means when the implement is at any height.

11. In apparatus for combination with a tractor adapted to have an implement hitched thereto and having mechanism for raising and lowering said implement between idle and working positions respectively, said apparatus comprising a power driven pump continuously discharging liquid and connected into a substantially closed hydraulic circuit, hydraulic means adapted to be operably connected to said implement and connected to be actuated by liquid pressure at the discharge side of the pump, a slide valve in said circuit operable between positions for respectively building up liquid pressure at the discharge side of the pump sufficient to actuate said hydraulic means to raise said implement and for reducing said pressure for lowering of said implement, motion transmitting means connected to said slide valve and adapted for operative connection to the implement for movement in response to changes in draft force exerted on said implement by said tractor, further valve means in series with said slide valve for preventing the liquid pressure acting on said hydraulic means from falling below a predetermined minimum value, a non-return valve connected in the hydraulic circuit between the pump and the hydraulic means, relief valve means on the pump side of said non-return valve for discharging liquid delivered by the pump direct to sump, means for automatically opening said relief valve means when the implement attains a fully raised position and for automatically closing said relief valve means when the implement is lowered from said fully raised position and including over-centre means for causing sudden opening and sudden closing of said relief valve means, further relief valve means on the side of said non-return valve remote from the pump for releasing liquid supporting the implement in a raised or partly raised position, and over-riding manual control means for opening said relief valve means and said further relief valve means when the implement is at any height.

13. In apparatus for combination with a tractor adapted to have an implement hitched thereto and having mechanism for raising and lowering said implement between idle and working positions respectively, said apparatus comprising a power driven pump continuously discharging liquid and connected into a substantially closed hydraulic circuit, hydraulic means adapted to be operably connected to said implement raising and lowering means and connected to be actuated by liquid pressure at the discharge side of the pump, a slide valve in said circuit operable between positions for respectively building up liquid pressure at the discharge side of the pump sufficient to actuate said hydraulic means to raise said implement and for reducing said pressure for lowering of said implement, a telescopic link in said mechanism for lengthening and shortening in accordance with changes in draft force exerted on said implement by said tractor, a cable connected to said slide valve and to said link for movement in response to both lengthening and shortening of the link due respectively to tensile and compressive forces acting thereon as a result of a preponderance of implement weight over draft force or vice versa, and further valve means for preventing the liquid pressure acting on said hydraulic means from falling below a predetermined minimum value.

13. In apparatus for combination with a tractor adapted to have an implement hitched thereto and having mechanism for raising and lowering said implement between idle and working poistions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a shaft for mounting on said tractor for rotation by said hydraulic means and adapted for operative connection with said mechanism, a slide valve in said circuit operable between closed and open positions for respectively building up liquid pressure at the discharge side of the pump sufficient to rotate said shaft to raise said implement and for reducing said pressure for lowering of said implement, a telescopic link connected between said tractor and said mechanism for lengthening and shortening due respectively to tensile and compressive forces acting on said link as a result of a preponderance of implement weight over draft force or vice versa, a cable connected to said slide valve and to said link for movement in response to lengthening and shortening of said link, further valve means for preventing the liquid pressure acting on said hydraulic means from falling below a predetermined minimum value, a non-return valve connected in the hydraulic circuit between the pump and said hydraulic means, relief valve means on the pump side of said non-return valve for discharging liquid delivered by the pump direct to sump, and means releasably connected to said shaft and to said relief valve means for automatically opening the latter when the implement attains a fully raised position and for automatically closing said relief valve means when the implement is lowered from said fully raised position.

References Cited in the file of this patent

UNITED STATES PATENTS

| 1,117,263 | Shute | Nov. 17, 1914 |
| 2,515,395 | Court | July 18, 1950 |
| 2,689,513 | Ferguson et al. | Sept. 21, 1954 |
| 2,851,938 | Giertz et al. | Sept. 16, 1958 |
| 2,887,167 | Heitshu et al. | May 19, 1959 |
| 3,014,535 | Marindin | Dec. 26, 1961 |

FOREIGN PATENTS

| 747,674 | Great Britain | Apr. 11, 1956 |